US007233304B1

(12) United States Patent
Aratani et al.

(10) Patent No.: US 7,233,304 B1
(45) Date of Patent: Jun. 19, 2007

(54) LIQUID CRYSTAL DISPLAY APPARATUS

(75) Inventors: Sukekazu Aratani, Hitachiota (JP); Ikuo Hiyama, Hitachi (JP); Masaya Adachi, Hitachi (JP); Tsunenori Yamamoto, Hitachi (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/532,740

(22) Filed: Mar. 22, 2000

(30) Foreign Application Priority Data

Mar. 23, 1999 (JP) ................................. 11-077204

(51) Int. Cl.
G09G 3/36 (2006.01)
(52) U.S. Cl. ........................................ 345/87; 345/102
(58) Field of Classification Search ................ 345/102, 345/104, 968, 3.9, 501, 536, 565, 87, 84; 349/5, 8, 62; 313/114; 353/98
See application file for complete search history.

(56) References Cited

U.S. PATENT DOCUMENTS

| | | | | |
|---|---|---|---|---|
| 5,138,783 A | * | 8/1992 | Forsse | 40/546 |
| 5,572,648 A | * | 11/1996 | Bibayan | 345/825 |
| 5,749,646 A | * | 5/1998 | Brittell | 362/231 |
| 5,856,686 A | * | 1/1999 | Watanabe et al. | 257/291 |
| 6,122,021 A | * | 9/2000 | Hirai et al. | 349/10 |
| 6,254,531 B1 | * | 7/2001 | Higuchi et al. | 600/178 |
| 6,473,067 B2 | * | 10/2002 | Maeda | 345/90 |
| 6,606,636 B1 | * | 8/2003 | Okazaki et al. | 707/104.1 |

FOREIGN PATENT DOCUMENTS

| | | | |
|---|---|---|---|
| JP | 63-85525 | | 4/1988 |
| JP | 05-165026 | * | 6/1993 |
| JP | 7-043699 | | 2/1995 |
| JP | 08-050276 | * | 2/1996 |
| JP | 9-288272 | | 11/1997 |
| JP | 10-039842 | * | 2/1998 |
| JP | 10-207400 | | 8/1998 |
| WO | WO 95/01701 | | 1/1995 |

* cited by examiner

Primary Examiner—Richard Hjerpe
Assistant Examiner—Abbas I. Abdulselam
(74) Attorney, Agent, or Firm—Antonelli, Terry, Stout and Kraus, LLP.

(57) ABSTRACT

A liquid crystal display apparatus comprises a liquid crystal display unit including a pair of substrates, at least one of which is transparent, a liquid crystal layer sandwiched by the pair of substrates, a plurality of electrodes for applying an electric field to at least one of the pair of substrates, and a plurality of active elements connected to the plurality of electrodes; a lighting device including a plurality of light sources; and a control unit for controlling ON/OFF of at least one light source for each of regions, into which the lighting device is divided, based on a display response of said liquid crystal display unit.

10 Claims, 11 Drawing Sheets

NOTE: THE NUMBERS ABOVE THE CLOCK-SIGNAL
WAVEFORM INDICATE THE SIGNAL SEQUENCE

LIQUID CRYSTAL DISPLAY APPARATUS

BACKGROUND OF THE INVENTION

The present invention relates to a liquid crystal display apparatus, and especially to an active matrix-type liquid crystal display apparatus.

In conventional active matrix-type liquid crystal display apparatus, a twisted nematic mode, a lateral electric field mode, MVA (Multidomain Vertical Alignment) mode, and so on which use nematic liquid crystal are used. Further, in those liquid crystal display apparatuses, there is a display method called a "hold type" display method, and in this display method, the same image is displayed during one display period of an image signal, that is, during one frame period.

When dynamic images are displayed on the "hold type" crystal display apparatus, one image of the dynamic images which actually change moment by moment is held during one frame period. That is, although one point in the displayed image is displayed at the correct position at one moment, the point in the displayed image is different from the actual point in other moments. Thus, since a human perceives dynamic images by averaging the displayed images, the perceived images are not focused.

A paper "Improving the Moving-Image Quality of TFT-LCDS" by K. Sueoka et al., IDRC '97, pp 203–206 (1998) discloses a technique in which, after the whole display panel has been scanned, a lighting device is turned on to eliminate the lack of focus due to the above averaging effect.

However, in the above technique, since the lighting device is turned on after the whole liquid crystal panel has been scanned, and the response of the whole liquid crystal has been completed, the scanning period and the response time must be significantly shortened. Also, since the lighting period of the lighting device is short, the light strength must be increased in order to achieve the same brightness as that in a conventional liquid crystal display method. Thus, it is necessary to increase the light-tube current, which in turn decreases the lifetime of the lighting device.

SUMMARY OF THE INVENTION

An object of the present invention is to provide an active matrix-type liquid crystal display apparatus which is capable of displaying dynamic images and preventing the above problems.

To achieve the above object, the present invention provides an active matrix-type liquid crystal display apparatus comprising a liquid crystal display unit including a pair of substrates, at least one of which is transparent, a liquid crystal layer sandwiched by the pair of substrates, a plurality of electrodes for applying an electric field to at least one of the pair of substrates, and a plurality of active elements connected to the plurality of electrodes; a lighting device including a plurality of light sources; and a control unit for controlling ON/OFF of at least one light source for each of regions into which the lighting device is divided, based on a display response of said liquid crystal display unit.

DETAILED DESCRIPTION OF THE EMBODIMENTS

Hereafter, details of the embodiments will be explained with reference to the drawings.

Embodiment 1

Figure 1:
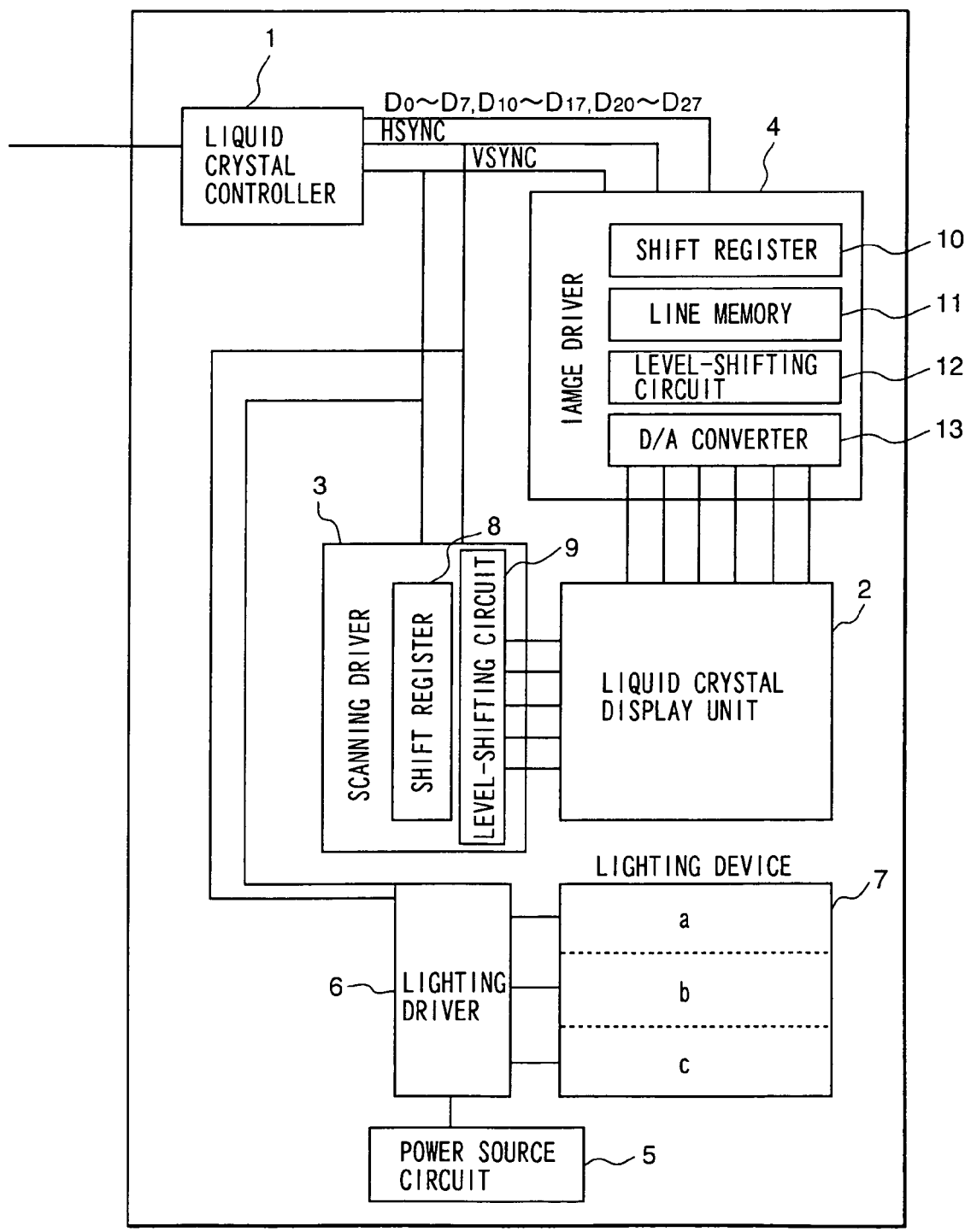
FIG. 1 is a schematic block diagram showing the composition of a liquid crystal display apparatus of an embodiment according to the present invention.

FIG. 1 shows the composition of a liquid crystal display apparatus of an embodiment according to the present invention. This liquid crystal display apparatus includes a liquid crystal controller 1, a liquid crystal display unit 2, a scanning driver (a scanning electrode-driver circuit) 3, an image driver (a pixel electrode-driver circuit) 4, a power source circuit 5, a lighting driver (a lighting control circuit) 6, and a lighting device 7. The liquid crystal display unit 2 is placed on the lighting device 7. Further, in order to prevent obscurity in the dynamic images, the lighting device 7 is divided into a plurality of regions, and the lighting driver 6 controls the lighting device 7 so that each region lights a corresponding region of the liquid crystal display unit 2. In the following, each unit or part in the liquid crystal display apparatus will be explained.

Figure 2:
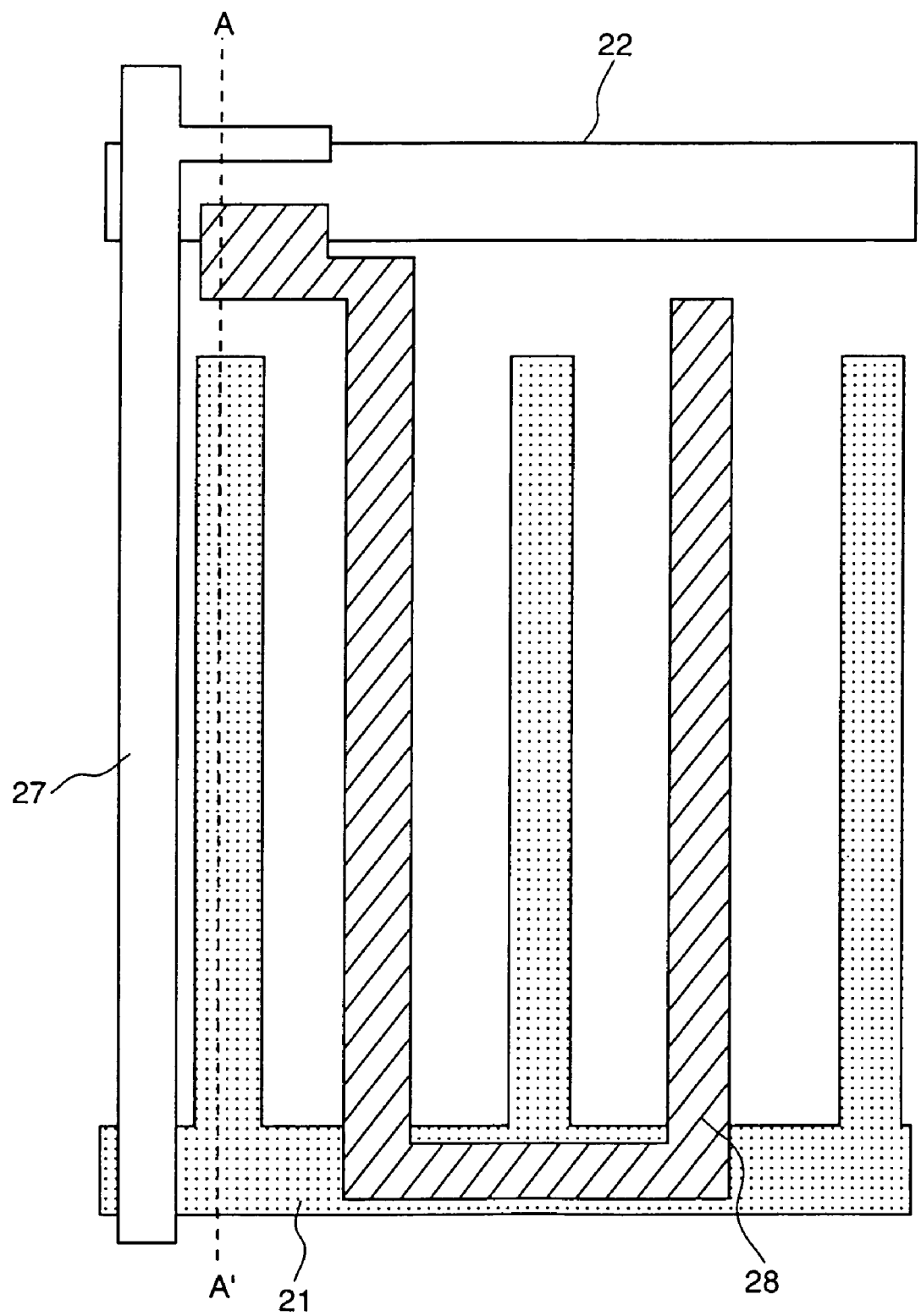
FIG. 2 is a partial-plan view of a liquid crystal display unit of the liquid crystal display apparatus.
Figure 3:
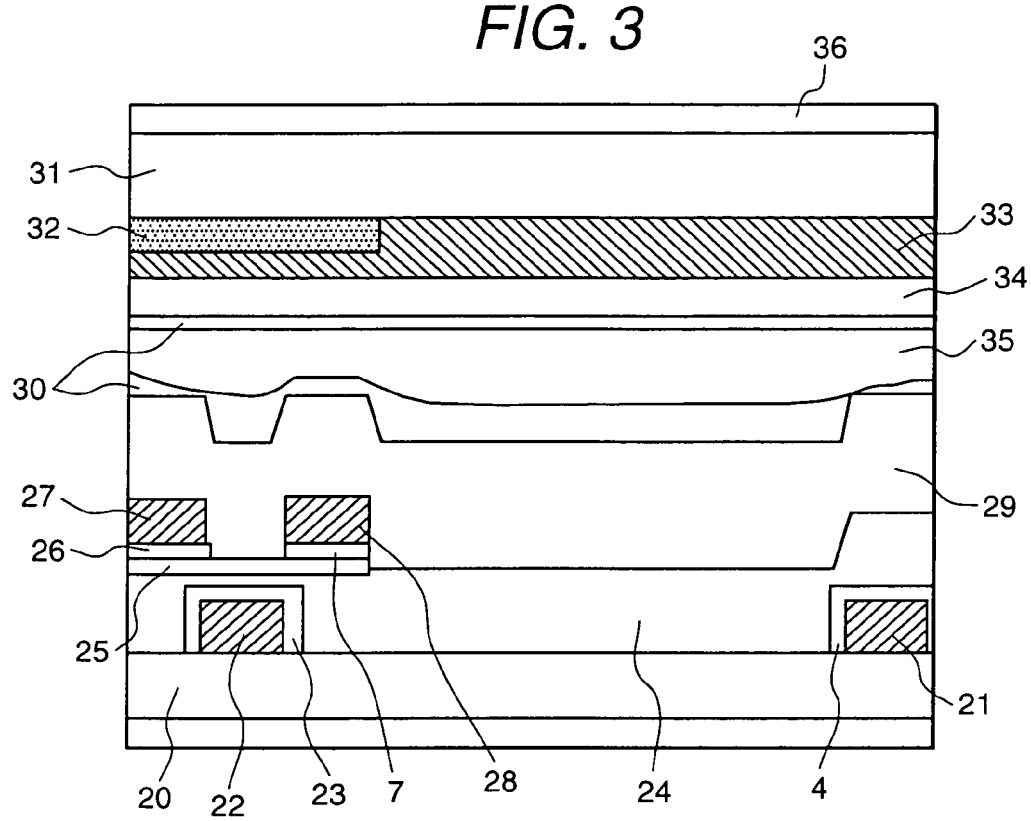
FIG. 3 is a vertical cross section of the liquid crystal display unit.

First, the liquid crystal display unit 2 is explained below. FIG. 2 shows a plan view of a pixel element in the liquid crystal display unit 2. Also, FIG. 3 shows a vertical cross section of the pixel element, which is viewed from the line A–A' shown in FIG. 2. There is a common electrode 21 and a scanning signal electrode 22, which are made of Al, on the glass substrate 20, and the surfaces of these electrodes 21 and 22 are covered with an alumina film 23. Further, a gate insulation film 24 made of SiN is formed above these electrodes, and amorphous Si (a-Si) film 25, n-type a-Si film 26, an image signal electrode 27 made of Al/C, and a TFT (Thin Film Transistor) of a pixel electrode 28 are moreover formed above the gate insulation film 24. Still further, a protection film 29 is formed on the above elements 25–28, and alignment films 30 is located above the protection film 29. The pixel is divided into four regions by the image signal electrode 27, the common electrode 21, and the pixel electrode 28. The pixel electrode 28 is partially superimposed on the common electrode 21, and the superimposed part acts as a holding capacitor. A black matrix 32 is formed on the substrate 31 on the side of a color filter layer 33, which is opposite to the above substrate 20, and the color filter layer 33 is located on the black matrix 32. Further, a protection layer 34 for the color filter layer 33 is formed on the color filter layer 33. Furthermore, the other one of the alignment films 30 is located on the protection layer 34. The liquid crystal layer 35 is inserted between the upper and lower alignment films 30. Moreover, the lighting device 36 including lamps 51 is placed on the glass substrate 20.

Figure 4:
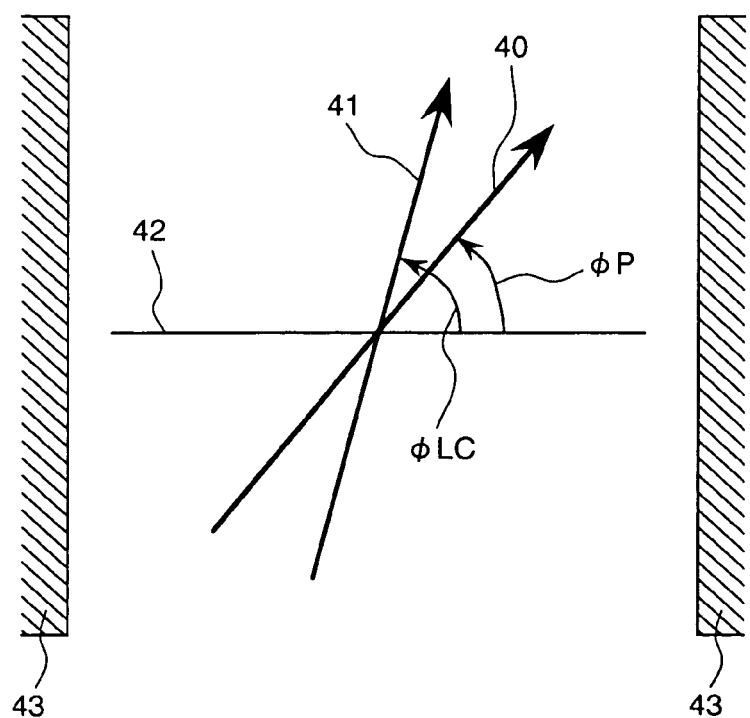
FIG. 4 is an illustration depicting the relationship among the transmission axis of one of polarization plates, the longitudinal axis in the liquid crystals, and the direction of the electric field applied to the liquid crystals.

FIG. 4 shows the relationship among the direction 40 of the transmission axis in one of polarization plates, the longitudinal direction 41 in the liquid crystals and the direction 42 of the electric field applied to the liquid crystals, where numeral 43 indicates electrodes 43. In the present invention, the direction 40 of the transmission axis in one of the polarization plates is set parallel to the longitudinal direction 41 of the liquid crystals, and the direction (not shown in this figure) of the transmission axis in the other one of the polarization plates is set perpendicular to the longitudinal direction 41 of the liquid crystals. By the above setting of those directions 40, 41, and 42, what is called a "normally closed mode" is obtained.

Further, the other units shown in FIG. 1 are explained below.

The liquid crystal controller 1 receives signals from the external equipment, and outputs data groups (D0–D7), (D10–D17), and (D20–D27), which are data for R, G, and B, respectively, a horizontal synchronization signal HSYNC, and a vertical synchronization signal VSYNC.

The composition of the liquid crystal controller 1 is changed depending on the contents of the signals input to the controller 1. The case of an analog signal input to the liquid crystal controller 1 is explained first. In the analog signal, image display-start signals are superimposed on image signals to display images on the liquid crystal display unit 2. The liquid crystal controller 1 includes an A/D converter. The controller 1 extracts the image signals, and the extracted image signals are converted into the three particular digital signals (D0–D7), (D10–D17), and (D20–D27) with the A/D converter. Further, the image display-start signals in the analog signal are output as the vertical synchronization signal VSYNC, and sampling clock signals in the A/D converter as output as the horizontal synchronization signal HSYNC.

Next, in the case when digital signals are input to the liquid crystal controller 1, the above digital image signals and the synchronization signals are generated by an external processor and input to the controller 1. Since the external processor generates the image signal data (D0–D7), (D10–D17), and (D20–D27) based on the synchronization signals VSYNC and HSYNC, and inputs them to the controller 1, those signals input to the controller 1 are output without modification.

The synchronization signals VSYNC and HSYNC output from the controller 1 are input to the scanning driver 3. The scanning driver 3 uses a shift register 8 to generate a signal for each scanning electrode in the liquid crystal display unit 2 based on the input synchronization signals VSYNC and HSYNC. Next, the level of the signal for each scanning electrode is determined by a level-shifting circuit 9, and the signal for each scanning electrode is output.

The data (D0–D7), (D10–D17), and (D20–D27), and the synchronization signals VSYNC and HSYNC, which are output from the controller 1, are input to the image driver 4. First, The data (D0–D7), (D10–D17), and (D20–D27) are input to a shift register 10, and are further input to a line memory 11 as a single line of data. Next, the levels of the data are determined by a level-shifting circuit 12, and the data are converted to analog signals by an A/D converter 13. The converted analog signals are output to the respective pixel electrodes in the liquid crystal display unit 2.

Figure 5:
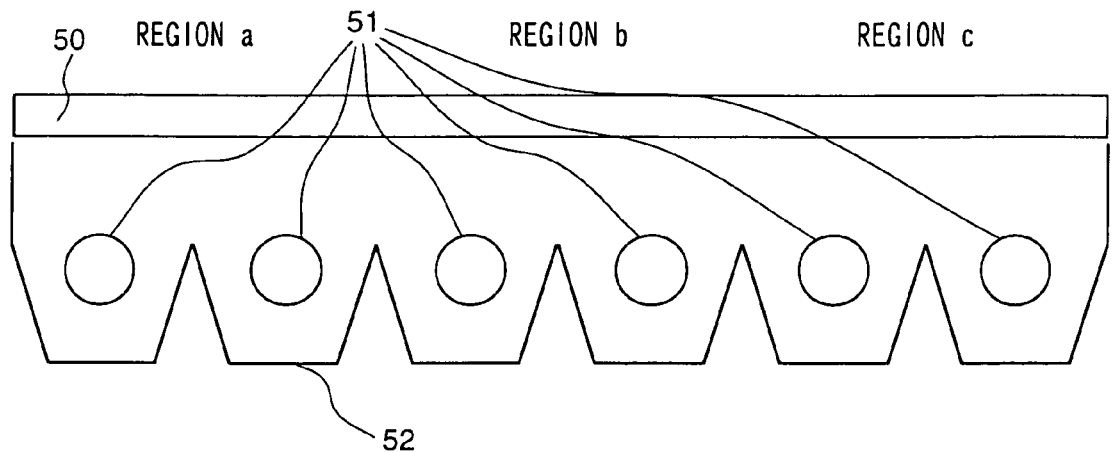
FIG. 5 is a diagram showing the composition of a lighting device of the embodiment.

FIG. 5 shows a vertical cross section of the lighting device 7 of the embodiment. A light diffusion plate 50 is located on the upper part of the lighting device 7, which contacts the liquid crystal display unit 2, and a plurality of lamps 51 are arranged under the light diffusion plate 50. Further, a light-reflection plate 52 is placed below the plurality of lamps 51. The lighting device 7 is controlled by the lighting driver 6 shown in FIG. 1.

The lighting driver 6 is connected to the power source circuit 5 and the lighting device 7, and it controls ON and OFF states of the lamps 51 in the lighting device 7 in order to prevent obscurity caused in the dynamic image display. In this embodiment, the lighting device 7 is divided into three region a, b, and c, and ON and OFF states of the lamps 51 in each region is controlled by the lighting driver 6.

Figure 6:
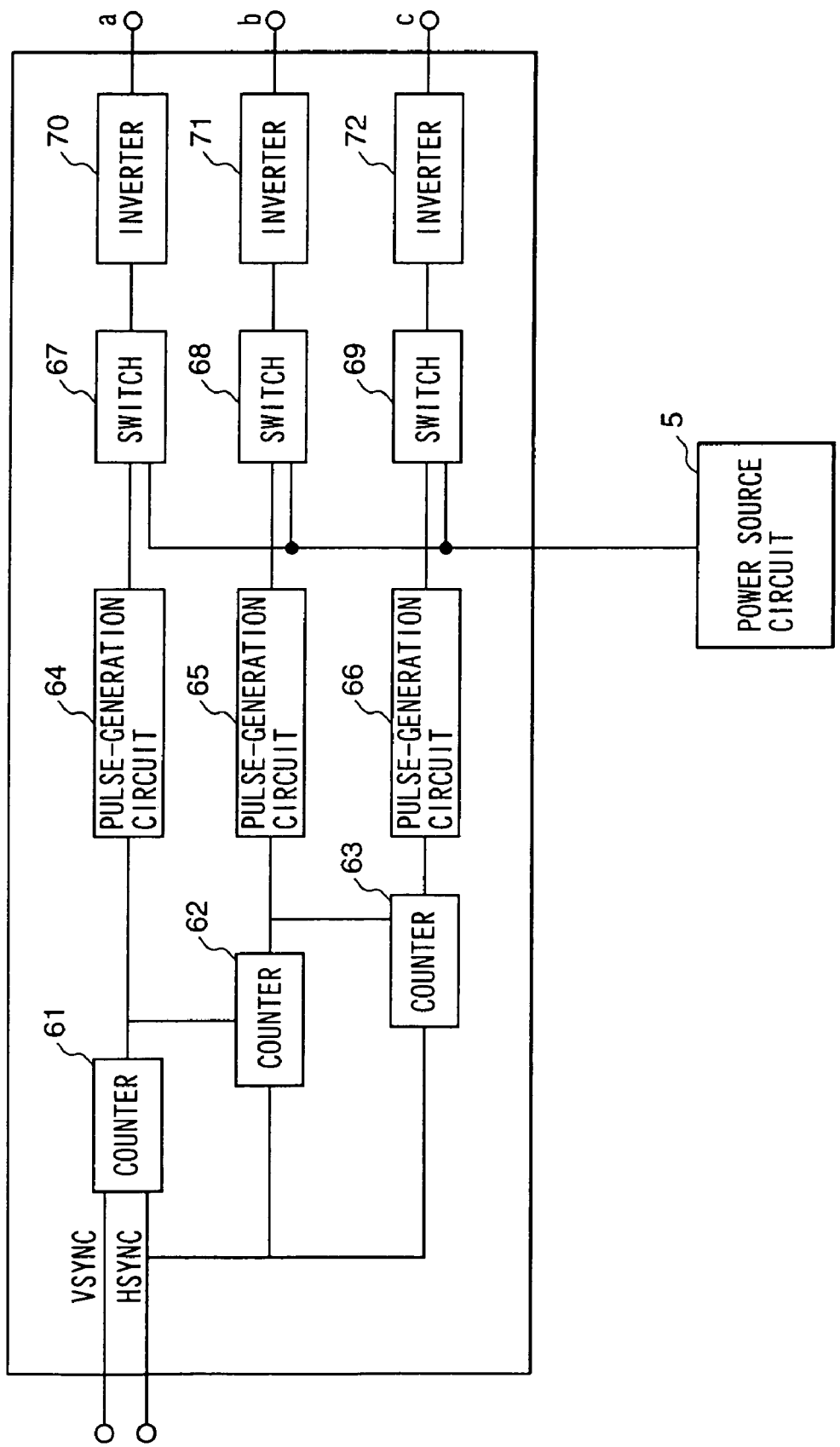
FIG. 6 is a schematic diagram showing the composition of a lighting driver of the embodiment.

FIG. 6 shows the schematic composition of a lighting driver of the embodiment. The lighting driver includes counters 61, 62, and 63, pulse-generation circuits 64, 65, and 66, switches 67, 68, and 69, and inverters 70, 71, and 72. The respective counters receive the horizontal synchronization signal HSYNC and count the number of pulses in the HSYNC. The pulse-counting of the respective counters will be explained later. The counters 61, 62, and 63 receive the vertical synchronization signal VSYNC, the output signal from the counter 61, and the output from the counter 62, respectively, as signals to start the pulse-counting. Further, when the pulse-generation circuits 64, 65, and 66 receive the output signals from the counters 61, 62, and 63, each pulse-generation circuit outputs a Hi (High)-level signal for a predetermined time. The respective switches 67, 68, and 69 are turned on while the output signals are in the Hi-level state. Power is then input from the power source circuit to the inverters 70, 71, and 72, and the lamps 51 in each region are lighted.

Figure 7:
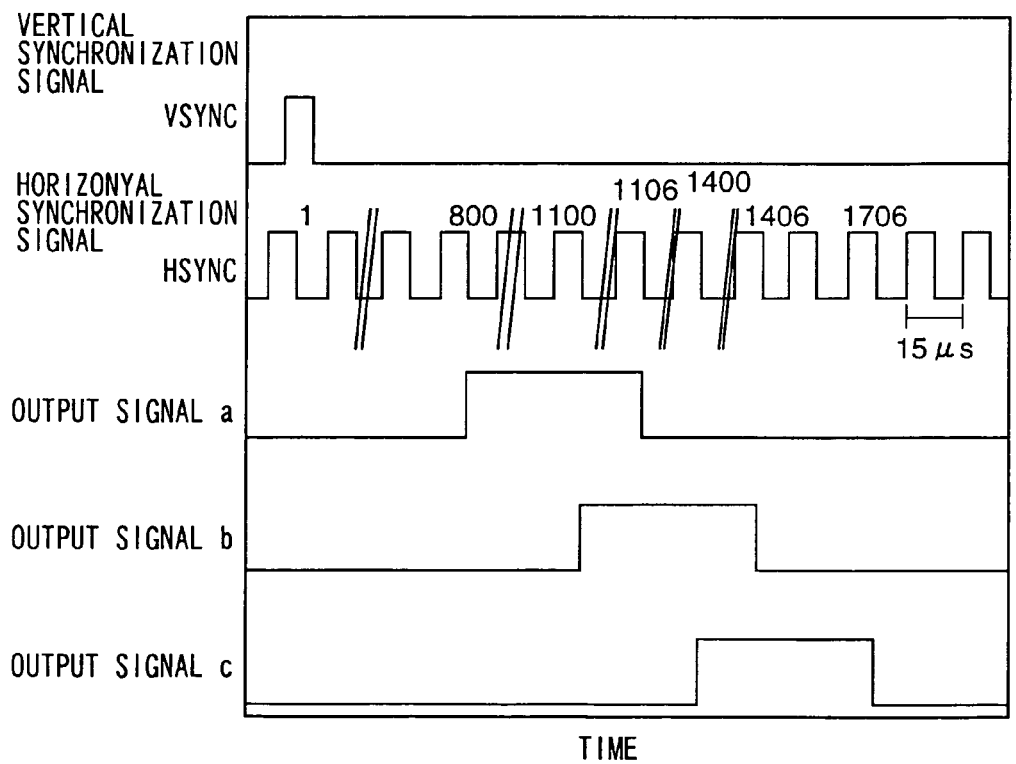
FIG. 7 is a time chart showing the operation of the lighting driver.

FIG. 7 is a time chart showing changes in the horizontal and vertical synchronization signals HSYNC and VSYNC, and the output signals from the inverters 70, 71, and 72. The operation of the lighting driver is explained below by taking an example in which the periods of the horizontal and vertical synchronization signals HSYNC and VSYNC is set to 16.6 ms and 15 µs, respectively, the scanning of the whole liquid crystal display unit 2 composed of 800×600 pixels takes 9 ms, and the response time of the liquid crystals is 9 ms for intermediate gradation. In this embodiment, the lighting device is divided into three regions a, b, and c, and lamps 51 in each region are lighted after the scanning of each region, and the response in the liquid crystals corresponding to that region have been completed. Thus, the regions a, b, and c are lighted after 12 ms, 15 ms, and 18 ms, respectively, for 4.6 ms after the start of the scanning of the portion corresponding to each region, of the liquid crystal display unit 2.

To achieve the above operation, the counter 61 outputs a signal when 800 pulses of the horizontal synchronization signal HSYNC have been counted. Also, the counter 62 outputs a signal when 200 pulses of the horizontal synchronization signal HSYNC have been counted after the counter 61 has output its signal, and then the counter 63 outputs a signal when 200 pulses of the horizontal synchronization signal HSYNC have been counted after the counter 62 outputted its signal. Further, the respective pulse-generation circuits 64, 65, and 66 output Hi-level signals for 4.6 ms after they have received output signals from the counters 61, 62, and 63.

Figure 8:
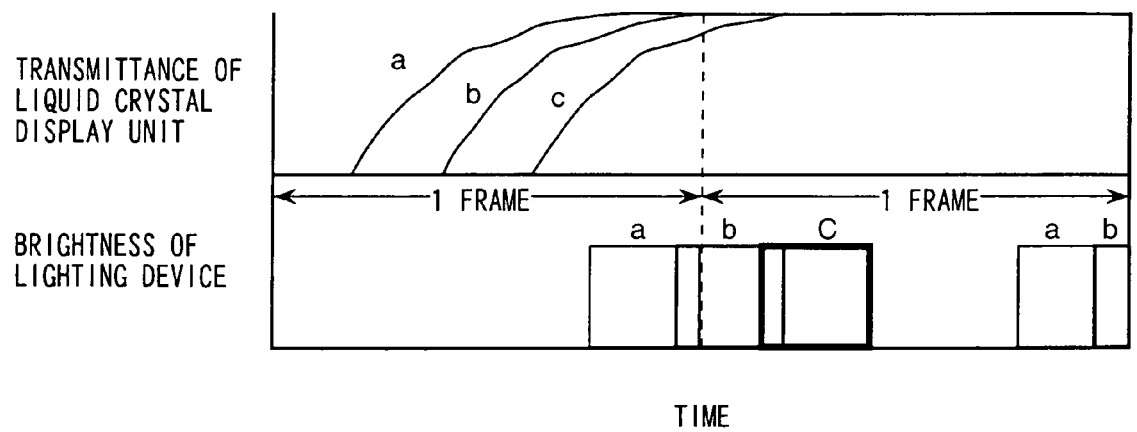
FIG. 8 is a time chart showing the relationship between the transmittance and the brightness of the liquid crystal display unit.

FIG. 8 is a time chart showing the relationship between the transmittance and the brightness of the liquid crystal display unit. The transmittance shown in this figure is the average value of the transmittance values of the three regions in the liquid crystal display unit 2. As shown in FIG. 8, the lamps 51 in each region of the lighting device 7 are controlled to be lighted after the transmittance of the liquid crystal display unit 2 has reached the saturation state.

Under the above-mentioned conditions, even if dynamic images obtained by moving a static image at a visual-angle speed of 10 degrees/s are displayed, there is no perceptible obscurity in the dynamic images.

In this embodiment, although a back light method in which the lamps 51 are located directly under the liquid crystal display unit 2 is adopted in the lighting device, the lighting method is not restricted to the back light method, and a usually used side-light method can also be used.

Embodiment 2

Figure 9:
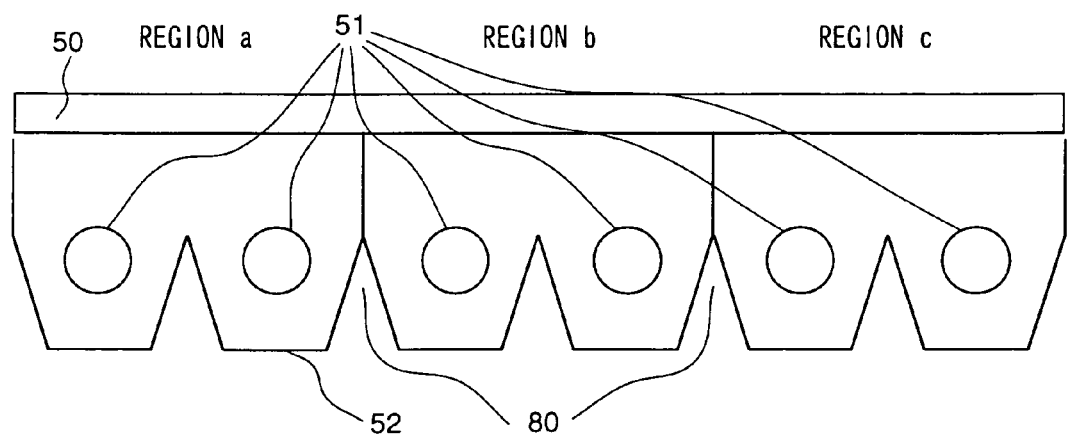
FIG. 9 is a diagram showing the composition of a lighting device in another embodiment according to the present invention.

In this embodiment, the device whose composition is shown in FIG. 9 is used as the lighting device 7. The composition of the liquid crystal display apparatus, other than this lighting device, is the same as the composition in Embodiment 1. The feature of the lighting device shown in FIG. 9 is that there are light-reflection plates 80 in each region in the lighting device 7 located such that they almost contact their respective region. In the liquid crystal display apparatus using this lighting device as well as that according to Embodiment 1, even if dynamic images obtained by moving a static image at a visual-angle speed of 10 degrees/s are displayed, there is no perceptible obscurity in the dynamic images. The degradation in the contrast at the boundary between the regions, which is somewhat perceptible in the apparatus according to Embodiment 1, does not occur.

Embodiment 3

In this embodiment, respective shutters located above the lamps 51 are opened and closed without turning the lamps on and off. The output signals from the lighting driver 6 shown in FIG. 1 are input to the shutters. Further, power is fed to each lamp in the lighting device 7 from the power source circuit 5, and the lamps 51 are always turned on.

Figure 10:
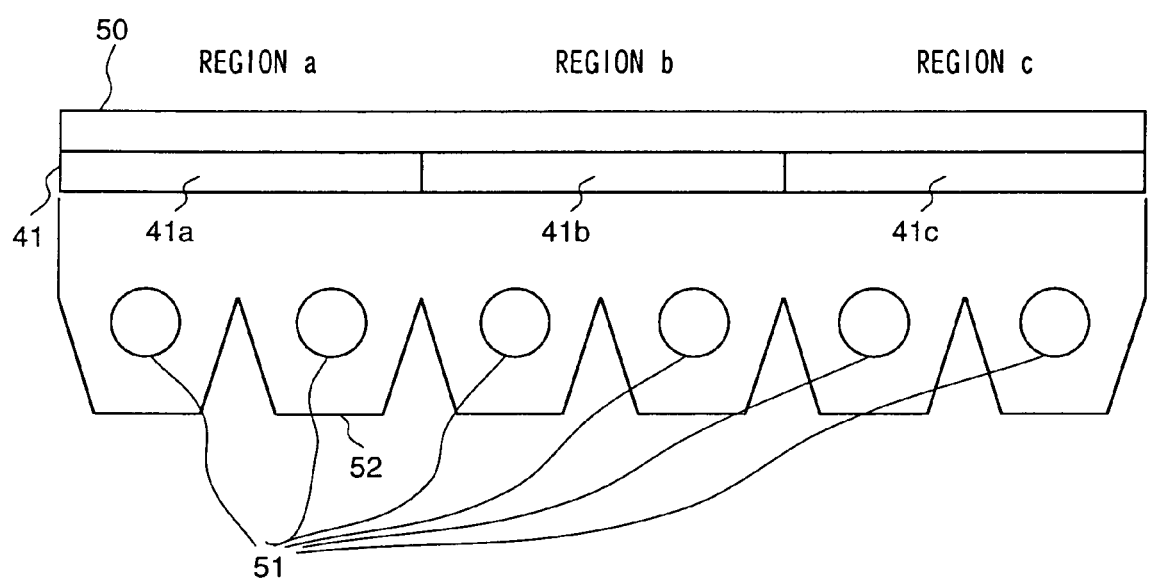
FIG. 10 is a diagram showing the composition of a lighting device in another embodiment according to the present invention.

FIG. 10 shows the composition of the lighting device 7 in this embodiment. This lighting device 7 includes the light diffusion plate 50, and the plurality of lamps 51 and light-reflection plates 52. Further, the shutters 41, 42, and 43 are located between the light diffusion plate 50 and the lamps 51 for the respective regions a, b, and c. These shutters 41, 42, and 43 are liquid crystal panels made of ferroelectric liquid crystals, and they are connected to the output terminals of the lighting driver 6. When the output signals from the lighting driver 6 are applied to the respective liquid crystal panels 41, 42, and 43, their operational states are changed to the white-display state, and the light of the lamps 51 is transmitted to the liquid crystal display unit 2. Since the lighting driver 6 shown in FIG. 6 outputs high-level voltage signals, it is necessary to change the composition of the lighting driver 6 so as to output low-level voltage signals. If the low-level voltage output from the power source circuit 5 is used directly, the above composition is more easily achieved.

Moreover, if the liquid crystal panels remaining in the white-display state when the voltage signal is not applied to them are used for the shutters, it is necessary to provide inverting circuits through which the output signals are send from the lighting driver 6.

The results of the evaluation of the liquid crystal display apparatus carried out using dynamic images in the same manner as that done for Embodiment 1 shows no perceivable obscuring. Further, since the lamps 51 are not turned on and of f, the lifetime of the lamps 51 can be extended. The lifetime of the lamps in Embodiment 1 is about 5000 h, and that of those in this embodiment is extended to about 8000 h. Although the ferroelectric liquid crystal material, which possesses a memorization function, is used for the shutters in this embodiment, any type of shutters with a high-speed response can attain the same effects. Furthermore, if their apertures can be adjusted, and light sensors or variable resistors are provided in the liquid crystal display apparatus, the apertures can be adjusted corresponding to the amount of light in the environment by changing the voltage from the power source circuit 51 based on the output signals from the light sensors or using the variable resistors. In this composition, the shutters are devices to adjust the quantity of the transmitted light.

Embodiment 4

Figure 11:
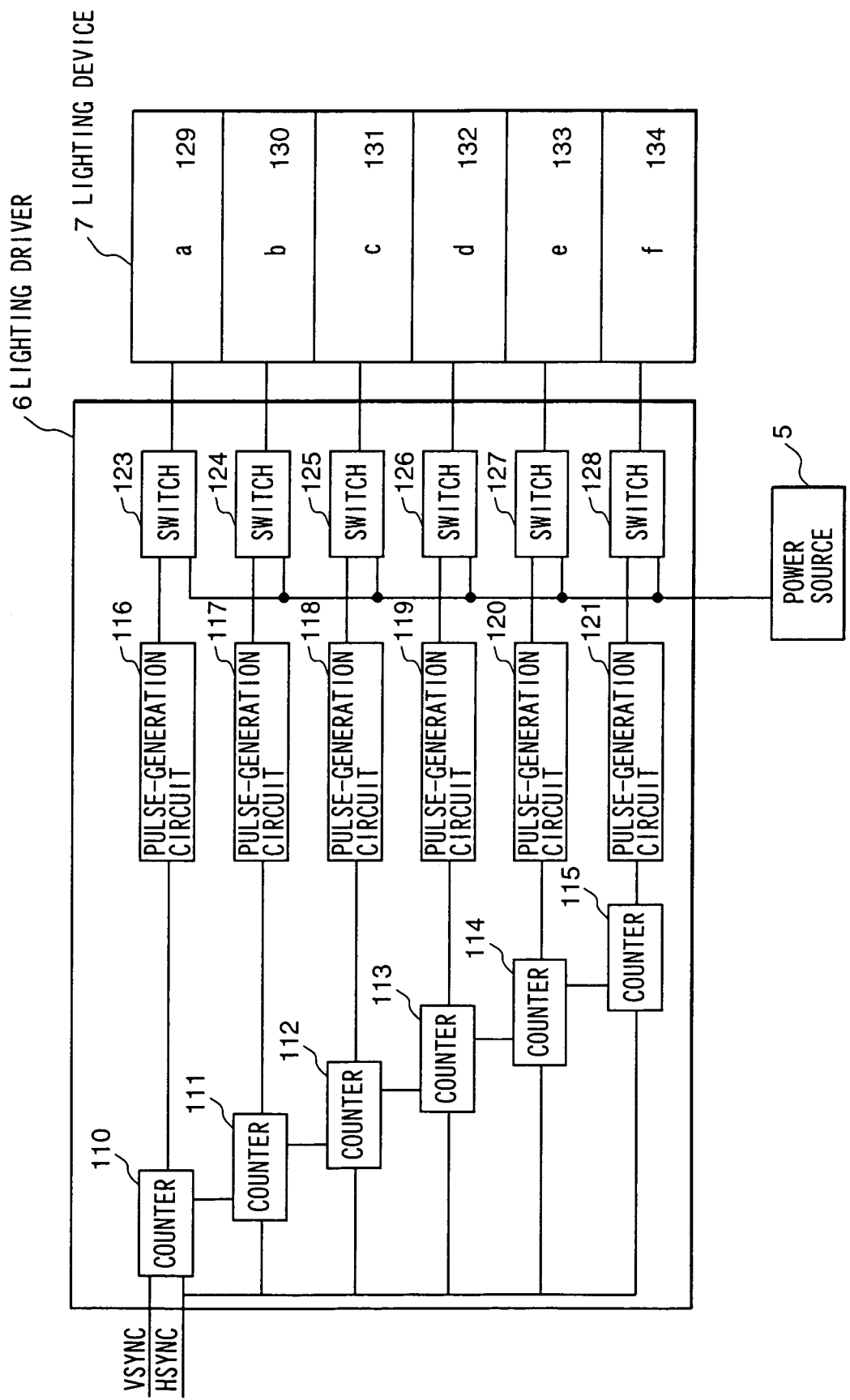
FIG. 11 is a schematic block diagram showing the composition of a lighting driver and a lighting device in another embodiment according to the present invention.

FIG. 11 is a schematic block diagram showing the composition of a lighting driver and a lighting device in this embodiment. This lighting driver 6 includes counters 110–115, pulse-generation circuits 116–121, and switches 123–128, and the operations of these circuits are the same as those in the lighting driver 6 shown in FIG. 6. The counters 110–115 receive the horizontal synchronization signal HSYNC, and count the pulses in the vertical synchronization signal VSYNC. Further, the counter 110 and the respective counters 111–115 use the vertical synchronization signal VSYNC and the output signals from their previous stages the as signals to start pulse-counting. Furthermore, when the respective pulse-generation circuits 116–121 receive the signals output from the counters 110–115, each pulse-generation circuit outputs a Hi-level signal for a predetermined time. The respective switches 123–128 output the voltage from the power source circuit 5 while the output signals from the respective pulse-generation circuits 116–121 are in the Hi-level state. The lighting device 7 includes a plurality of surface emission elements 129–134. The plurality of surface emission-type elements 129–134 emit light when they respectively receive the power output from the switches 123–128.

In the following, the operational conditions for each circuit in the lighting driver 6 shown in FIG. 11 will be explained. Under operational conditions such that the scanning time for the whole liquid crystal display unit 2 is 16.2 ms, and the response time of the liquid crystal display unit 2 is 9 ms, in the same manner as that in Embodiment 1, the surface emission element 129 of the region a starts light-emission 11.7 ms after the start of scanning on the liquid crystal display unit 2, and ends the light-emission 4.9 ms after its starting it. Further, the regions b, c, d, e, and f start light-emission 14.4 ms, 17.1 ms, 19.8 ms, 22.5 ms, and 25.2 ms, respectively, after the start of scanning in the liquid crystal display unit 2, and end the light-emission at 4.9 ms after their starting the respective light-emission.

To achieve the above operation, the counter 110 outputs a signal when 585 pulses of the horizontal synchronization signal HSYNC have been counted after the counter 110 received the vertical synchronization signal VSYNC. Also, the counters 111–115 output their respective signals when 135 pulses of the horizontal synchronization signal HSYNC have been counted after each counter received the signal output from the counter for the previous stage. Further, the respective pulse-generation circuits 116–121 output Hi-level signals during 4.6 ms after they have received output signals from the counters 110–115.

Figure 12:
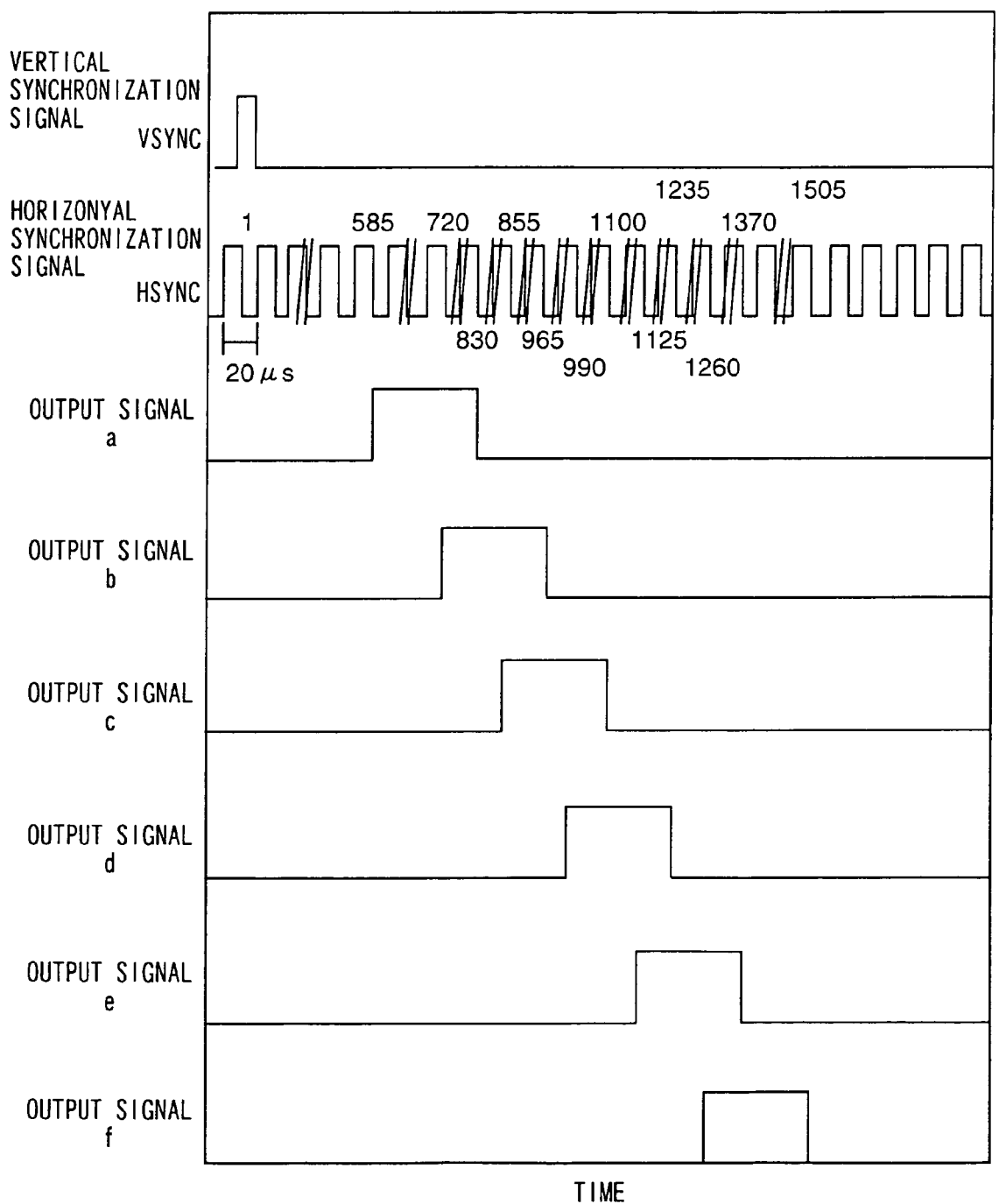
FIG. 12 is a time chart showing the operation of the lighting driver shown in FIG. 11.

FIG. 12 is a time chart showing the operation of the lighting driver 6 shown in FIG. 11.

When a static image which has been moved is displayed on the liquid crystal display apparatus according to this embodiment in the same manner as Embodiment 1, there is no perceptible obscurity in the simulated dynamic images. Although the number of region divisions is 6, this number is not restricted to 6. As described above, if the number of region divisions is increased, the scanning time for the whole display unit can be extended. Therefore, increasing the number of region divisions is effective in a case when the selection time for one scanning line necessarily becomes short, such as in the case of a large screen and high definition-type display. If the lighting device with surface emission-type elements in this embodiment or shutters in Embodiment 3 is used, the number of region divisions can be increased, which in turn can extend the selection time for one scanning line. Moreover, if surface emission-type elements are used as shown in this embodiment, the diffusion plate 50 and the lamps 51 used in Embodiments 1, 2, and 3 are not necessary, and this can make the lighting device 7 thinner. Here, EL elements, surface emission-type fluorescent tubes, and so on can be used for the surface emission-type element in this embodiment. Furthermore, lighting elements in each of which LEDs are arranged in a plane can be used. However, in the above lighting element structure, a diffusion plate is necessary.

Although the lateral electric field mode is used for the liquid crystal display mode in the above-described embodiments, the liquid crystal display mode is not restricted to the lateral electric field mode. The above embodiments can be implemented with the twisted nematic mode, the MVA mode, the OCB (Optically Compensated Bent cell) mode, and so on.

Embodiment 5

The liquid crystal display apparatus according to this embodiment is composed such that the display mode is switched between a dynamic image-display mode and a static image-display mode. The composition and operation of this liquid crystal display apparatus are explained below.

Figure 13:
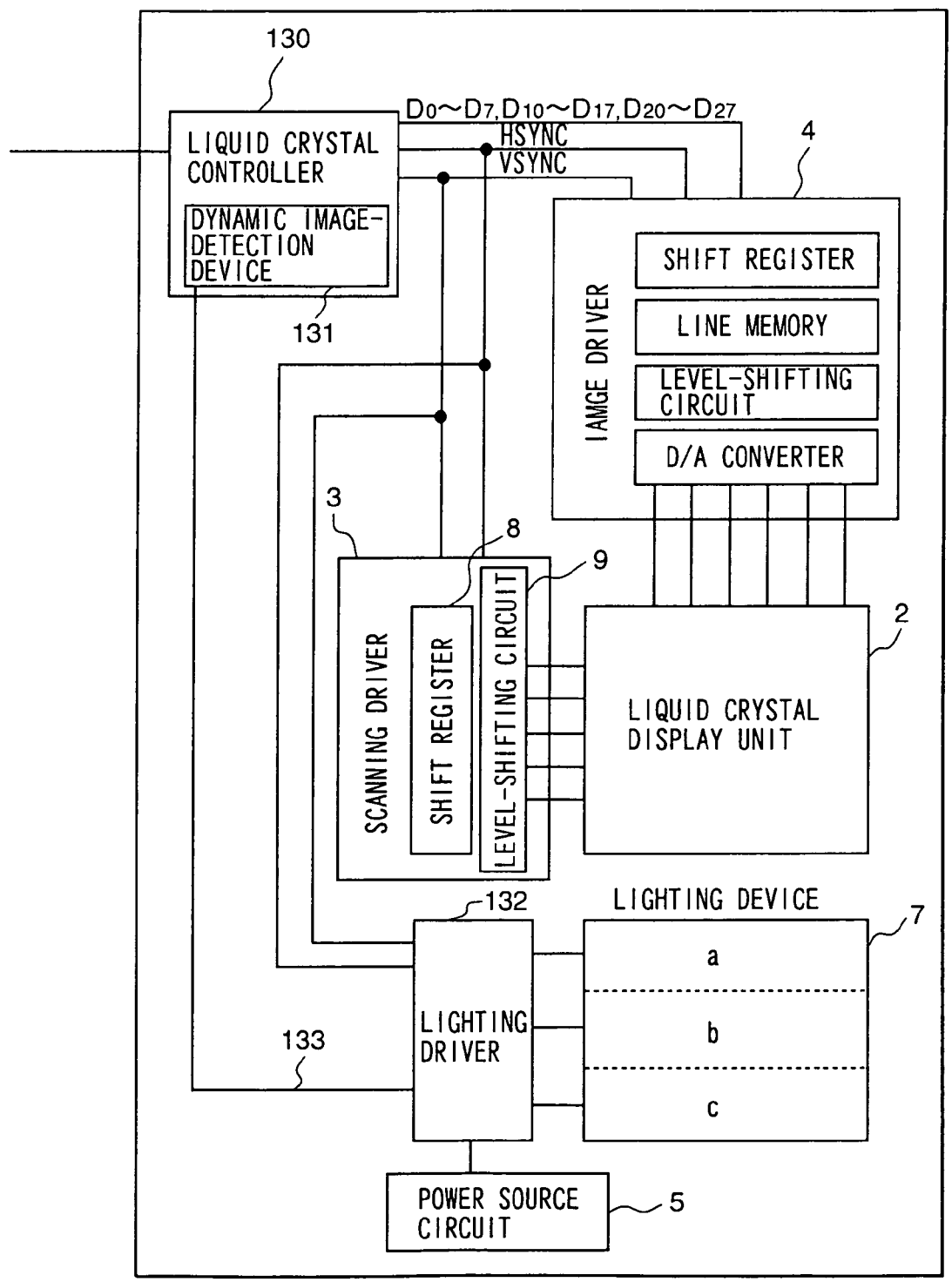
FIG. 13 is a schematic block diagram showing the composition of a liquid crystal display apparatus of another embodiment according to the present invention.

FIG. 13 is a schematic block diagram showing the composition of the liquid crystal display apparatus of this embodiment. This liquid crystal display apparatus includes a liquid crystal controller 130, the liquid crystal display unit 2, the scanning driver 3, the image driver 4, the power source circuit 5, a lighting driver 132, and the lighting device 7. The liquid crystal display unit 2, the scanning driver 3, the image driver 4, the power source circuit 5, and the lighting device 7 are the same as those in Embodiment 1. The liquid crystal controller 130 includes a dynamic image-detection device 131, which receives signals from external equipment and determines whether or not the received signals constitute dynamic images. That is, this dynamic image-detection device 131 compares the image signals of one frame which has just been input with those of one frame which was previously input. If the discrepancy between the image signals of the one frame which has just been input with those of one frame which was previously input is larger than a predetermined value, the dynamic image-detection device 131 determines that dynamic images have been input. Although the comparison is performed between the two groups of image signals for the two frames in the above example, the comparison can be performed among the three groups of image signals for three frames: that is, the present, previous, and next previous frames. The result detected by the dynamic image-detection device 131 in the liquid crystal controller 130 is input to the lighting driver 132 via a signal line 133.

Figure 14:
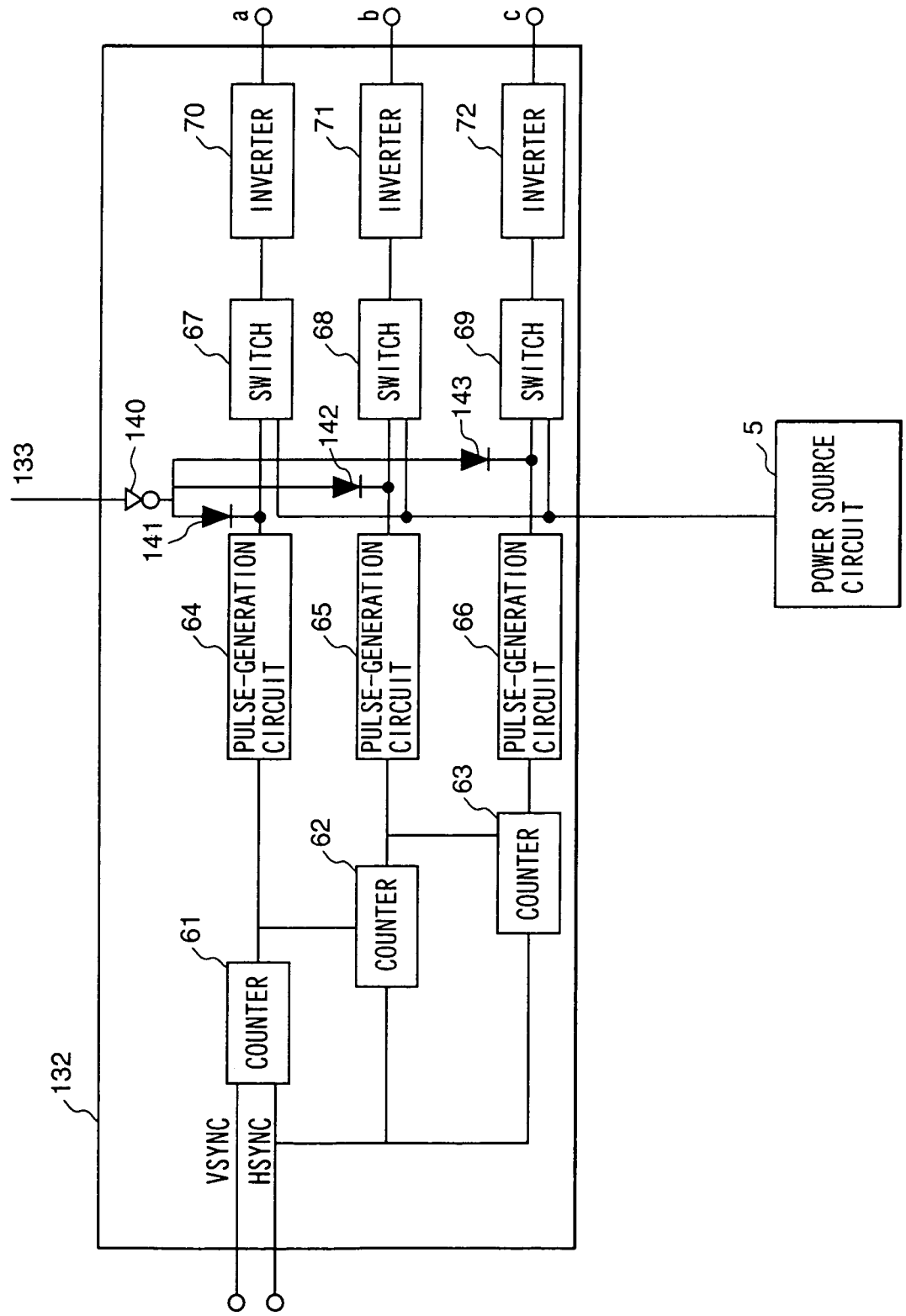
FIG. 14 is a schematic block diagram showing the composition of a lighting driver in another embodiment according to the present invention.

FIG. 14 is a schematic block diagram showing the composition of the lighting driver 132 in this embodiment. This lighting driver 132 includes the counters 61–63, the pulse-generation circuits 64–66, the switches 67–69, and the inverter 70–72. The operations of the counters 61–63 and the pulse-generation circuits 64–66 are the same as those shown in FIG. 6. The respective switches 67–69 are connected to the pulse-generation circuits 64–66, and further to the signal line 133 connected to the dynamic image-detection device 131 in the liquid crystal controller 130 via inverting circuits 140 and respective diodes 141–143. The operations of the switches 67–69 are explained below. The dynamic image-detection device 131 outputs a signal to the signal line 133 when it detects dynamic images. In the lighting driver 132, since the signal sent to the signal line 133 is inverted by the inverting circuit 140, the level of the sent signal is changed to a low-level signal, and thus the switches 67–69 are not turned on. That is, when dynamic images are detected by the dynamic image-detection device 131, the switches 67–69 are controlled by the pulse-generation circuits 64–66, respectively. Conversely, when dynamic images are not detected by the dynamic image-detection device 131, a signal is not output to the signal line 133 from the dynamic image-detection device 131. Accordingly, in the lighting driver 132, the low-level signal sent from the dynamic image-detection device 131 is inverted to a high-level signal by the inverting circuit 140, and thus the switches 67–69 are turned on. That is, when dynamic images are not detected by the dynamic image-detection device 131, the switches 67–69 are continuously turned on, and the voltage is output to the lighting device 7 from the power source circuit 5 via the lighting driver 132. In this way, while a static image is input, the switches 67–69 are continuously turned on.

According to this embodiment, since the liquid crystal display apparatus dynamically responds only when dynamic images are input, the power consumption can be reduced. For example, the power consumption in displaying a static image is about one fourth of that in displaying dynamic images. Meanwhile, a detection circuit such as that described in this embodiment is not always used to switch the display mode between dynamic and static image-display mode, and a signal in a personal computer, which indicates that a TV tuner, a dynamic CDROM, or a dynamic image-reproducing program is operated in the personal computer, can be used to switch the display mode.

In accordance with the present invention, it is possible to provide a liquid crystal display apparatus which can smoothly display dynamic images without obscurity.

What is claimed is:

1. A liquid crystal display apparatus comprising:
a liquid crystal display unit including a pair of substrates, at least one of which is transparent, a liquid crystal layer sandwiched by said pair of substrates, a plurality of electrodes for applying an electric field to at least one of said pair of substrates, and a plurality of active elements connected to said plurality of electrodes;
a lighting device including a plurality of light sources which is divided into plural regions for illuminating corresponding plural illumination regions of an entirety of a display area of the liquid crystal display unit; and
a control unit for controlling ON and OFF states of a light source for each of the plural regions into which said lighting device is divided, in synchronization with horizontal synchronization signals and vertical synchronization signals, so that the ON state of individual ones of the plural regions of the divided lighting device is shifted among the plural regions, and an individual illumination region of the plural illumination regions of the entirety of the display area of the liquid crystal display unit is correspondingly shifted therewith.

2. A liquid crystal display apparatus according to claim 1, wherein said display response of said liquid crystal display unit is the scanning of the entire liquid crystal display unit.

3. A liquid crystal display apparatus comprising:
a liquid crystal display unit for displaying image signals;
a drive unit for driving said liquid crystal display unit;
a lighting device including a light-adjustment unit for adjusting a quantity of light from a light source, which is transmitted to each of plural regions into which the lighting device is divided for illuminating corresponding plural illumination regions of an entirety of a display area of the liquid crystal display unit; and
a control unit for controlling each light-adjustment unit in synchronization with horizontal synchronization signals and vertical synchronization signals, so that the adjusted light quantity of individual ones of the plural regions of the divided lighting device is shifted among the plural regions and an individual illumination region of the plural illumination regions of the entirety of the display area of the liquid crystal display unit is correspondingly shifted therewith.

4. A liquid crystal display apparatus according to claim 3, wherein said light-adjustment unit transmits light when no voltage is applied to said light-adjustment unit.

5. A liquid crystal display apparatus according to one of claims 1 and 3, wherein said light source is a surface emission-type element.

6. A liquid crystal display apparatus according to claim 3, wherein each region in said lighting device is partitioned with partition plates.

7. A liquid crystal display apparatus according to claim 3, wherein said display response of said liquid crystal display unit is the scanning of the entire liquid crystal display unit.

8. A liquid crystal display apparatus comprising:
a liquid crystal display unit;
a controller for controlling image-displaying performed by said liquid crystal display unit, which includes a determining circuit for determining whether image signals to be displayed on said liquid crystal display unit are for a static image or a dynamic image;
a drive unit for driving said liquid crystal display unit based on a signal sent from said controller;
a lighting device which includes a plurality of light sources, for transmitting light from said plurality of light sources to said liquid crystal display unit; and
a control unit for controlling ON and OFF states of a light source for each of plural regions into which said lighting device is divided, in synchronization with horizontal synchronization signals and vertical synchronization signals, when dynamic images are displayed in accordance with a result in said determination performed by said controller.

9. A liquid crystal display apparatus according to claim 8, wherein said control unit turns on all light sources in said lighting device while a static image is displayed in accordance with a result in said determination of said controller.

10. A liquid crystal display apparatus according to claim 8, wherein a dynamic image display response of said liquid crystal display unit is the scanning of the entire liquid crystal display unit.

* * * * *